(12) United States Patent
Huang et al.

(10) Patent No.: US 7,529,041 B2
(45) Date of Patent: May 5, 2009

(54) OPTICAL LENS SYSTEM FOR TAKING IMAGE

(75) Inventors: Yeo-Chih Huang, Taichung (TW); Hsiang-Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 11/858,888

(22) Filed: Sep. 20, 2007

(65) Prior Publication Data

US 2008/0165435 A1    Jul. 10, 2008

(30) Foreign Application Priority Data

Jan. 5, 2007    (TW) .............................. 96100545 A

(51) Int. Cl.
*G02B 9/14*    (2006.01)
*G02B 3/02*    (2006.01)
*G02B 9/00*    (2006.01)

(52) U.S. Cl. .................... 359/789; 359/785; 359/716; 359/740

(58) Field of Classification Search ............... 359/784, 359/785, 789, 708, 716, 738–740
See application file for complete search history.

(56) References Cited

U.S. PATENT DOCUMENTS

| 7,286,305 | B2 * | 10/2007 | Nakamura | 359/784 |
| 7,304,807 | B2 * | 12/2007 | Isono | 359/716 |
| 7,342,729 | B2 * | 3/2008 | Sato et al. | 359/753 |

* cited by examiner

*Primary Examiner*—Ricky L. Mack
*Assistant Examiner*—Jack Dinh
(74) *Attorney, Agent, or Firm*—Banger Shia

(57) ABSTRACT

An optical lens system for taking image comprises three lens elements with refractive power, from the object side to the image side: a first lens element with positive refractive power having a convex object-side surface and a convex image-side surface, and the object-side surface being aspheric; a plastic second lens element with negative refractive power having a concave object-side surface and a convex image-side surface, and the front and image-side surfaces thereof being aspheric; a plastic third lens element with positive refractive power having a convex object-side surface and a concave image-side surface, the front and image-side surfaces thereof being aspheric; wherein an aperture stop is located between the first and second lens elements. By such arrangements, it can reduce the volume and sensitivity of the optical lens system, and furthermore can obtain higher resolution.

19 Claims, 4 Drawing Sheets

OPTICAL LENS SYSTEM FOR TAKING IMAGE

BACKGROUND OF THE INVENTION

1. Field of the Invention

The present invention relates to an optical lens system, and more particularly to a miniaturized optical lens system for taking image used in a camera mobile phone.

2. Description of the Prior Art

In recent years, with the popularity of camera mobile phone, the optical lens system for taking image has been becoming thinner and thinner, and the sensor of a general digital camera is none other than CCD (Charge Coupled Device) or CMOS (Complementary Metal Oxide Semiconductor). Due to advances in semiconductor manufacturing, the pixel size of sensor has been being reduced continuously, and miniaturized optical lens systems for taking image have increasingly higher resolution. Therefore, the demand for the image quality becomes increasingly urgent.

A conventional mobile phone's lens assembly usually consists of three lens elements: from the object side to the image side: a first lens element with positive refractive power, a second lens element with negative refractive power and a third lens element with positive refractive power, thus forming the so-called type of Triplet. To correct the aberration, the optical lens system usually takes the form of "front aperture stop". However, the arrangement of front aperture stop will increase the occurrence of stray light and the sensitivity of the optical lens system.

The present invention mitigates and/or eliminates the afore-described disadvantages.

SUMMARY OF THE INVENTION

The primary objective of the present invention is to improve the image quality and effectively reduce the volume of the optical lens system. The present invention provides a whole new three-lens type optical lens system.

An optical lens system for taking image in accordance with the present invention comprises three lens elements with refractive power, from the object side to the image side:

a first lens element with positive refractive power having a convex object-side surface and a convex image-side surface, and the object-side surface of the first lens element being aspheric;

a plastic second lens element with negative refractive power having a concave object-side surface and a convex image-side surface, and the front and image-side surfaces of the second lens element being aspheric;

a plastic third lens element with positive refractive power having a convex object-side surface and a concave image-side surface, the front and image-side surfaces of the third lens element being aspheric;

wherein an aperture stop of the optical lens system is located between the first and second lens elements.

In the present optical lens system for taking image, the object-side surface and the image-side surface of the first lens element with positive refractive power are convex. The object-side surface and the image-side surface of the second lens element with negative refractive power are concave and convex, respectively. And the object-side surface and the image-side surface of the third lens element with positive refractive power are convex and concave, respectively. By such arrangements, the image quality can be improved effectively.

An electronic sensor is disposed in the optical lens system, and an object to be photographed is imaged on the electronic photosensitive assembly. The first lens element provides a positive refractive power, and the aperture stop is located close to the object side, so that the exit pupil of the optical lens system will be far away from the image plane. Therefore, the light will be projected onto the sensor with a relatively small incident angle, this is the telecentric feature of the image side, and this feature is very important to the photosensitive power of the current solid-state sensor, and can improve the photosensitivity of the sensor while reducing the probability of the occurrence of vignetting. And at least one inflection point is formed on the third lens element to making it easier for the optical designer to control light's incident angle on the sensor. In addition, for a wide-angle optical lens system, it particularly needs to correct the distortion and the chromatic aberration of magnification, the correction method is to arrange the aperture stop at the balance point of the refractive power of the optical lens system. And the aperture stop of the optical lens system of the present invention is located between the first lens element and the second lens element, the purpose of such an arrangement is to balance the telecentric and wide field of view. Further, the position of the aperture stop can effectively reduce the refraction angle of the light with respect to the lens element, thus reducing the sensitivity of the optical lens system.

With the trend of miniaturization of the optical lens system and the requirement of increasing the field of view, the focal length of the optical lens system is becoming very short. Therefore, the radius of curvature and the size of the lens elements must be very small, and it is impossible to make such glass lens elements by the use of the conventional grind method. Plastic material is introduced to make lens elements by injection molding, using a relatively low cost to produce high precision lens elements. The surface of lens element is aspheric for allowing more design parameters (than spherical surfaces), so as to better reduce the aberration and the number of the lens elements, so that the length of the optical lens system can be reduced effectively.

In the present optical lens system for taking image, an Abbe number of the second lens element is V2, and it satisfies the relation:

$V2 < 40$

The above relation can effectively correct the chromatic aberration caused by the system, and improve the resolution of the optical lens system for taking image.

And it will be better if the Abbe number V2 of the second lens element satisfies the relation:

$V2 < 28$

And it will be much better if the Abbe number V2 of the second lens element satisfies the relation:

$V2 < 25$

In the present optical lens system for taking image, the refractive index of the first lens element is N1, the refractive index of the second lens element is N2, and they satisfy the relations:

$N1 < 1.6$ $N2 < 1.75$

If the refractive indexes of the first and second lens elements are higher than the high limit as stated above, it will be difficult to find an appropriate plastic optical material to match the optical lens system.

And it will be better if the refractive index of the second lens element satisfies the relation:

$N2 < 1.65$

In the present optical lens system for taking image, the radius of curvature of the object-side surface of the first lens element is R1, the radius of curvature of the image-side surface of the first lens element is R2, and they satisfy the relation:

$0.01 < |R1/R2| < 0.35$

If the value of R1/R2 is lower than the low limit as stated above, it will be difficult to correct the astigmatism caused by the optical lens system for taking image. On the other hand, if the value of R1/R2 is higher than the above high limit, it will be difficult to correct the spherical aberration caused by the optical lens system. And it will be better if the value of R1/R2 satisfies the relation:

$0.03 < |R1/R2| < 0.18$

In the present optical lens system for taking image, the radius of curvature of the object-side surface of the second lens element is R3, the radius of curvature of the image-side surface of the second lens element is R4, and they satisfy the relation:

$0.45 < R3/R4 < 0.6$

If the value of R3/R4 is lower than the low limit as stated above, R3 will be smaller, and the length of the optical lens system for taking image will be too long. On the other hand, if the value of R3/R4 is higher than the high limit as stated above, R3 will be relatively large, and the chromatic aberration caused by the optical lens system for taking image will become difficult to correct.

In the present optical lens system for taking image, the radius of curvature of the object-side surface of the third lens element is R5, the radius of curvature of the image-side surface of the third lens element is R6, and they satisfy the relation:

$0.3 < R5/R6 < 0.45$

The above relation can effectively correct the high order aberration of the optical lens system for taking image.

In the present optical lens system for taking image, the center thickness of the second lens element is CT2, and it satisfies the relation:

$0.25 \text{ mm} < CT2 < 0.4 \text{ mm}$

If the value of CT2 is lower than the high limit as stated above, it can reduce the length of the optical lens system while improving the image quality effectively. If the value of CT2 is higher than the low limit as stated above, the plastic lens elements made by injection molding will be more homogeneous in material properties.

In the present optical lens system for taking image, the distance between the second lens element and the third lens element is T23, and it satisfies the relation:

$T23 > 0.25 \text{ mm}$

The relation as stated above can effectively correct the high order aberration of the optical lens system for taking image.

In the present optical lens system for taking image, the focal length of the first lens element is f1, the focal length of the optical lens system is f, and they satisfy the relation:

$f/f1 > 0.95$

If the value of f/f1 is smaller than the above low limit, the refractive power of the optical lens system for taking image will be weak, the length of the optical lens system for taking image will be too long, and it will be difficult to suppress the incident angle of light to the photosensitive assembly. Further, it will be better if the value of f/f1 satisfies the relation:

$f/f1 > 1.22$

In the present optical lens system for taking image, the focal length of the second lens element is f2, the focal length of the optical lens system is f, and they satisfy the relation:

$0.7 < |f/f2| < 1.4$

If the value of |f/f2| is smaller than the above low limit, it will be difficult to correct the chromatic aberration caused by the optical lens system, and if the value of |f/f2| is greater than the above high limit, the length of the optical lens system for taking image will be too long, and this will be counter to the objective of miniaturization of the optical lens system for taking image.

In the present optical lens system for taking image, the focal length of the third lens element is f3, the focal length of the optical lens system is f, and they satisfy the relation:

$f/f3 > 0.7$

If the value of f/f3 is smaller than the above low limit, the back focal length of the optical lens system will be too long.

In the present optical lens system for taking image, the radius of curvature of the object-side surface of the first lens element is R1, and it satisfies the relation:

$R1 < 2.3 \text{ mm}$

The above relation can effectively improve refractive power of the first lens element and reduce the length of the optical lens system for taking image.

It will be better if R1 satisfies the relation:

$R1/f < 0.52$

In the present optical lens system for taking image, the radius of curvature of the object-side surface of the second lens element is R3, and it satisfies the relation:

$|R3| < 1.0 \text{ mm}$

The above relation can effectively correct the chromatic aberration caused by the optical lens system.

It will be better if R3 satisfies the relation:

$|R3/f| < 0.23$

In the present optical lens system for taking image, an object to be photographed is imaged on an electronic sensor, a length of the optical lens system is TL, an image height of the optical lens system is ImgH, and they satisfy the relation:

$TL/ImgH < 2.05$

The above relation contributes to the miniaturization of the optical lens system for taking image.

In the present optical lens system for taking image, the chief ray angle of the maximal field of view is CRA, half of the maximal field of view is HFOV, and they satisfy the relation:

$$0.45 < (\tan(CRA))/(\tan(HFOV)) < 1.15$$

The above relation makes the optical lens system compatible with the electronic sensor, and enables the optical system for taking image to have a wide field of view.

DETAILED DESCRIPTION OF THE PREFERRED EMBODIMENTS

Figure 1:
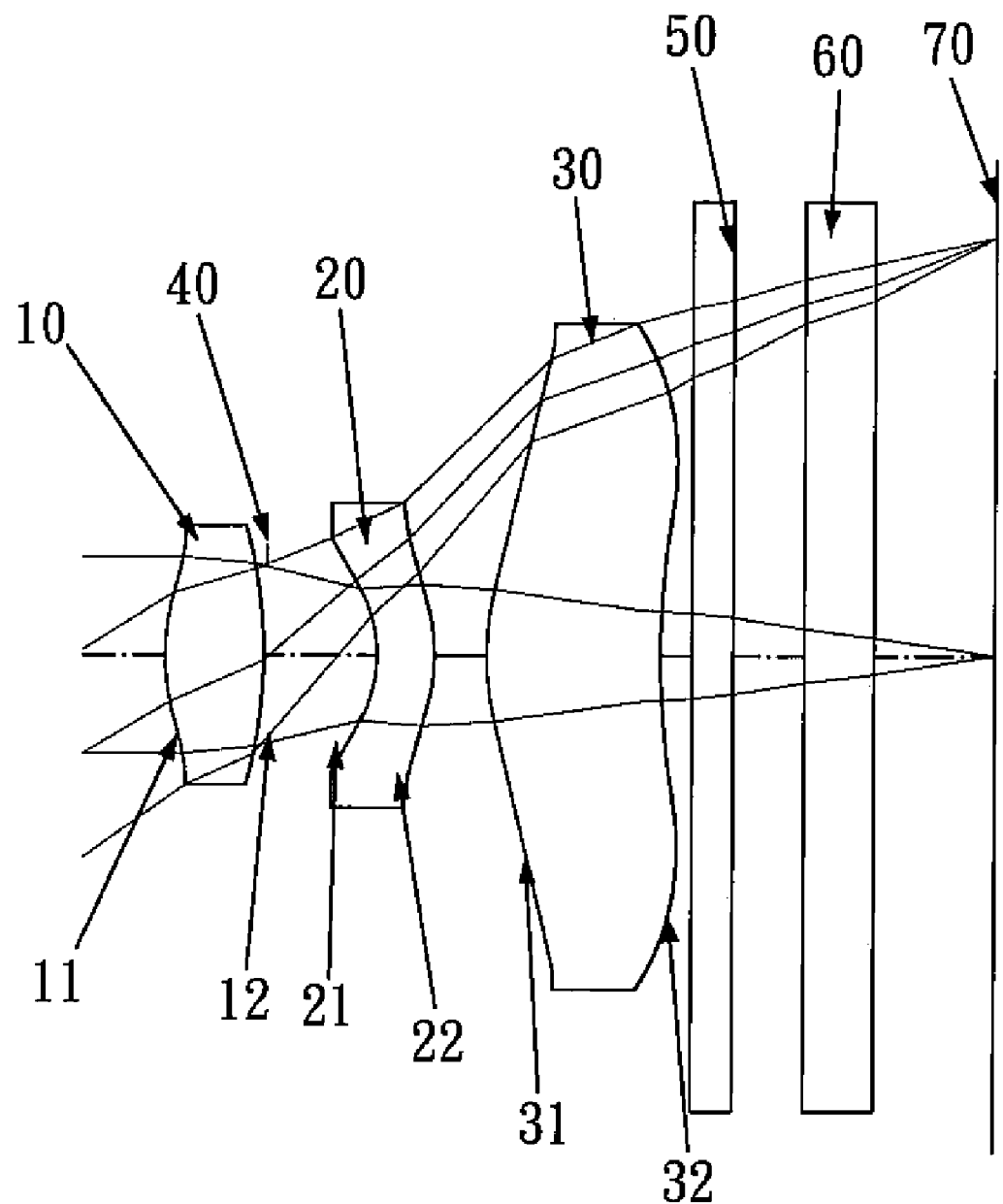
FIG. 1 shows an optical lens system for taking image in accordance with a first embodiment of the present invention.
Figure 2:
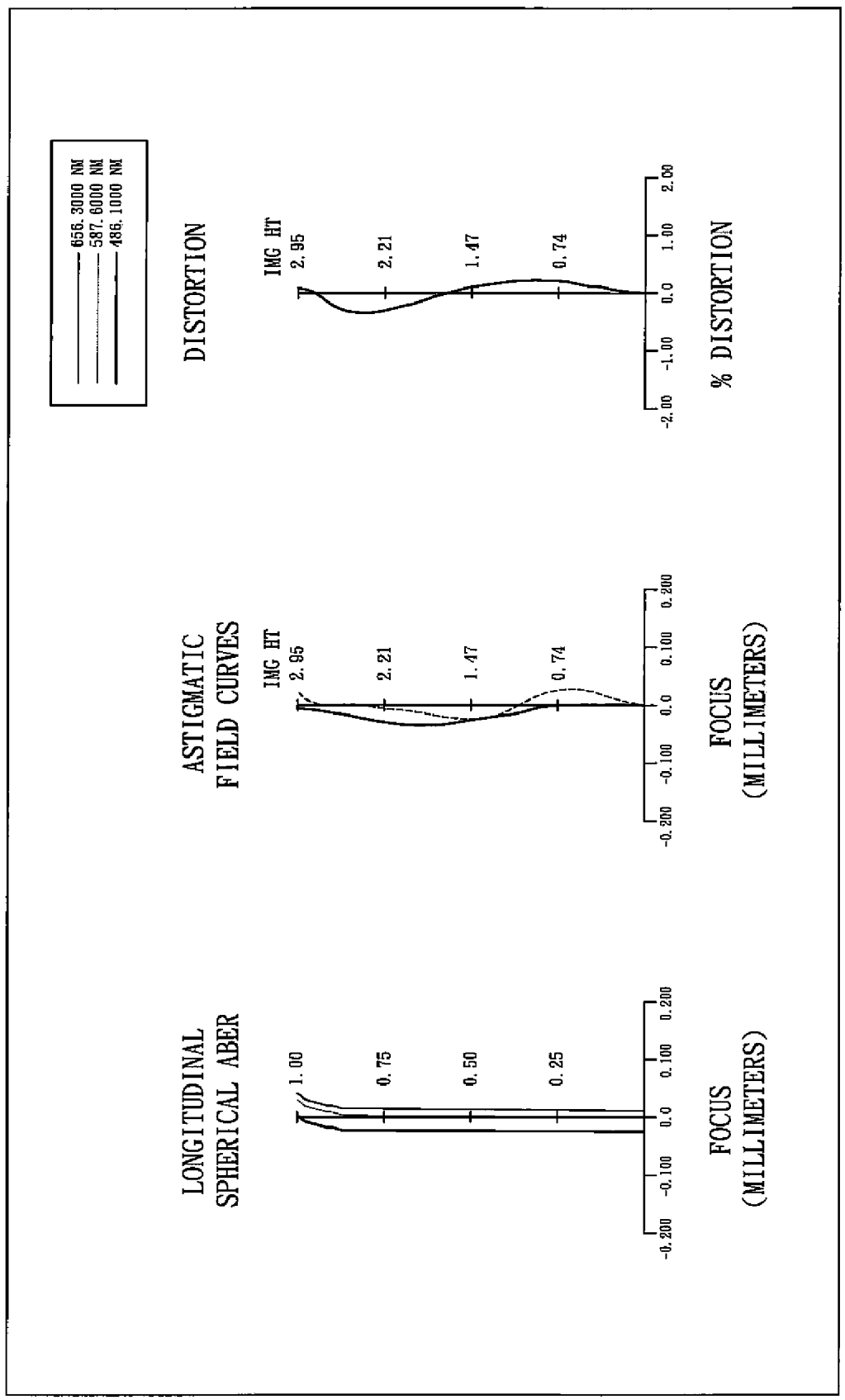
FIG. 2 shows the aberration curve of the first embodiment of the present invention.

Referring to FIG. 1, which shows an optical lens system for taking image in accordance with a first embodiment of the present invention, and FIG. 2 shows the aberration curve of the first embodiment of the present invention. The first embodiment of the present invention is an optical lens system for taking image comprising three lens elements with refractive power. An electronic sensor is disposed in the optical lens system, and an object to be photographed is imaged on an electronic photosensitive assembly. The optical lens system for taking image comprises: from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a concave image-side surface 32, the object-side surface 31 and the image-side surface 32 of the third lens element 30 are aspheric, and each of the two surfaces is formed with an inflection point.

An aperture stop 40 is located between the first lens element 10 and the second lens element 20.

An IR cut filter 50 is located behind the third lens element 30 and has no influence on the focal length of the optical lens system.

A sensor cover glass 60 is located behind the IR cut filter 50 and has no influence on the focal length of the optical lens system.

An image plane 70 is located behind the sensor cover glass 60.

The equation of the curve of the aspheric surfaces is expressed as follows:

$$X(Y) = (Y^2/R)/(1 + sqrt(1 - (1+k)*(Y/R)^2)) + A_4*Y^4 + A_6*Y^6 + \ldots$$

wherein:

X: the length of a line drawn from a point on the aspheric lens surface at a distance Y from the optical axis to the tangential plane of the aspheric surface vertex;

Y: the distance from the point on the curve of the aspheric surface to the optical axis;

K: represents the conic coefficient;

$A_4, A_6 \ldots$ : the aspheric surface coefficients of the fourth order, sixth order, . . . .

In the present optical lens system for taking image of the first embodiment, the Abbe number of the second lens element is V2, and it satisfies the relation: V2=30.2.

In the first embodiment of the optical lens system for taking image, the refractive index of the first lens element is N1, and the refractive index of the second lens element is N2, and they satisfy the relations: N1=1.543, N2=1.583.

In the first embodiment of the optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, they satisfy the relations: |R1/R2|=0.16, R3/R4=0.47, R5/R6=0.35.

In the first embodiment of the optical lens system for taking image, the focal length of the first lens element is f1, the focal length of the second lens element is f2, the focal length of the third lens element is f3, the focal length of the optical lens system for taking image is f, and they satisfy the relations: f/f1=1.27, |f/f2|=1.34, f/f3=1.02.

In the first embodiment of the optical lens system for taking image, the center thickness of the second lens element is CT2, the distance between the second lens element and the third lens element is T23, and they satisfy the relations: CT2=0.412 mm, T23=0.372 mm.

In the first embodiment of the optical lens system for taking image, the radius of curvature of the object-side surface of the first lens element is R1, the radius of curvature of the object-side surface of the second lens element is R3, the focal length of the optical lens system for taking image is f, and they satisfy the relations: R1=2.17692 mm, |R3|=0.86293 mm, R1/f=0.49, |R3/f|=0.19.

In the first embodiment of the optical lens system for taking image, the length of the optical lens system is TL, the image height of the optical lens system is ImgH, and they satisfy the relation: TL/ImgH=1.98.

In the first embodiment of the optical lens system for taking image, the chief ray angle of the maximal field of view is CRA, half of the maximal field of view is HFOV, and they satisfy the relation:

$$(\tan(CRA))/(\tan(HFOV)) = 0.62.$$

The detailed optical data the structure of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 4.46 mm, Fno = 3.2, HFOV (half of field of view) = 33.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.17692(ASP) | 0.695 | Plastic | 1.543 | 60.3 | 3.51 |
| 2 | | −13.65360(ASP) | 0.029 | | | | |
| 3 | Ape. Stop | Plano | 0.790 | | | | |
| 4 | Lens 2 | −0.86293(ASP) | 0.412 | Plastic | 1.583 | 30.2 | −3.33 |
| 5 | | −1.82560(ASP) | 0.372 | | | | |
| 6 | Lens 3 | 1.69512(ASP) | 1.200 | Plastic | 1.53 | 55.8 | 4.34 |
| 7 | | 4.85580(ASP) | 0.200 | | | | |
| 8 | IR-filter | Plano | 0.300 | Glass | 1.517 | 64.1 | — |
| 9 | | Plano | 0.500 | | | | |
| 10 | Cover Glass | Plano | 0.500 | Glass | 1.517 | 64.1 | — |
| 11 | | Plano | 0.832 | | | | |
| 12 | Image | Plano | | | | | |

TABLE 2

Aspheric Coefficient

| | Surface # | | | | | |
|---|---|---|---|---|---|---|
| | 1 | 2 | 4 | 5 | 6 | 7 |
| K = | −4.99211E+00 | 0.00000E+00 | −2.76683E+00 | −1.05978E−01 | −9.44264E+00 | −8.14044E−01 |
| A4 = | 3.17804E−02 | −7.49594E−02 | −2.79510E−01 | −9.48993E−02 | −2.36368E−02 | −4.33032E−02 |
| A6 = | −4.44694E−02 | −5.63114E−02 | 7.01204E−02 | 1.76372E−01 | 7.28042E−03 | 6.95890E−03 |
| A8 = | −7.22686E−03 | −9.94422E−03 | 7.04308E−01 | 4.23241E−02 | −7.39719E−04 | −1.46641E−03 |
| A10 = | −2.34074E−02 | 3.23528E−02 | −7.13427E−01 | −4.83725E−02 | — | 2.69776E−04 |
| A12 = | — | — | — | — | — | −2.21278E−05 |

Figure 3:
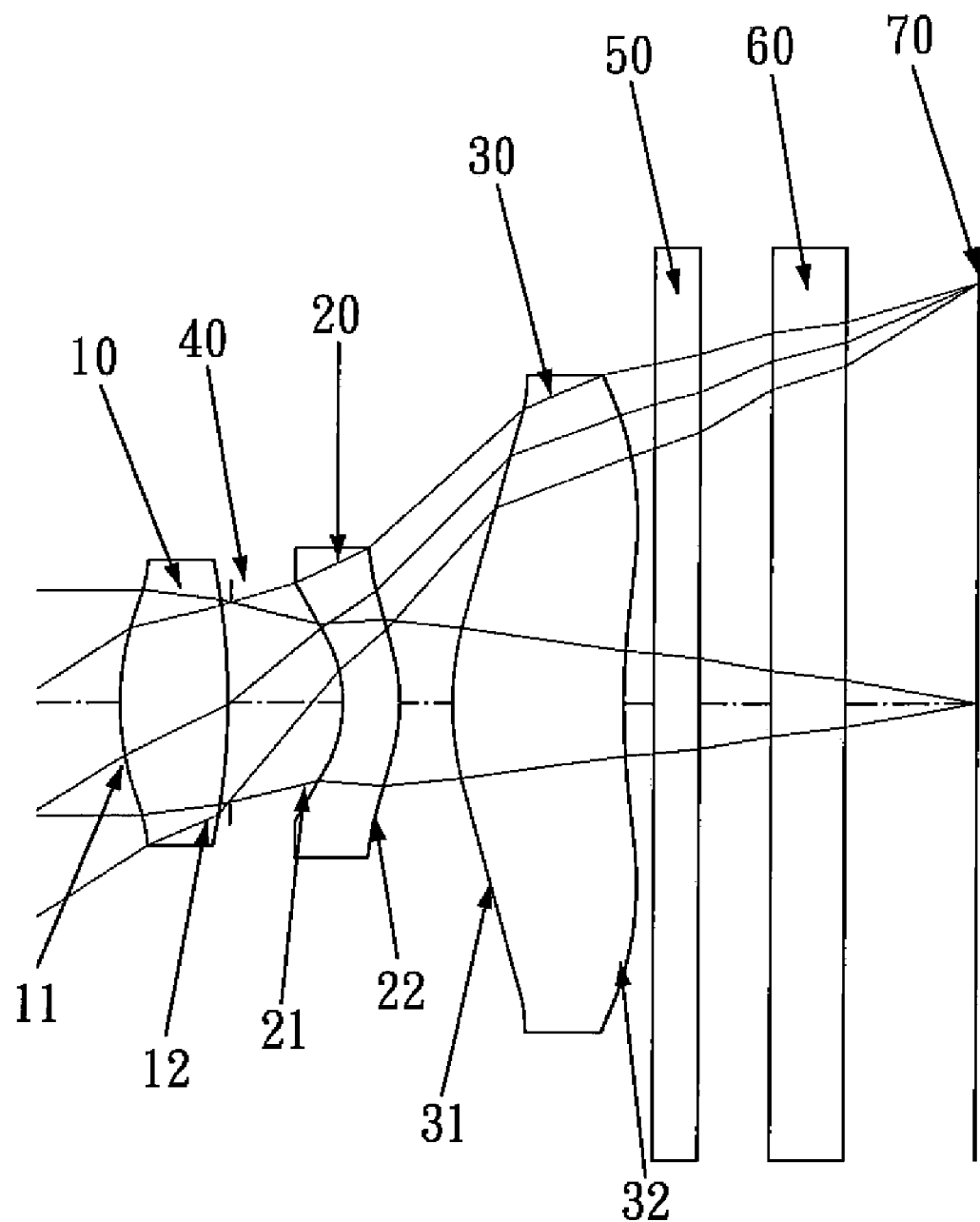
FIG. 3 shows an optical lens system for taking image in accordance with a second embodiment of the present invention.
Figure 4:
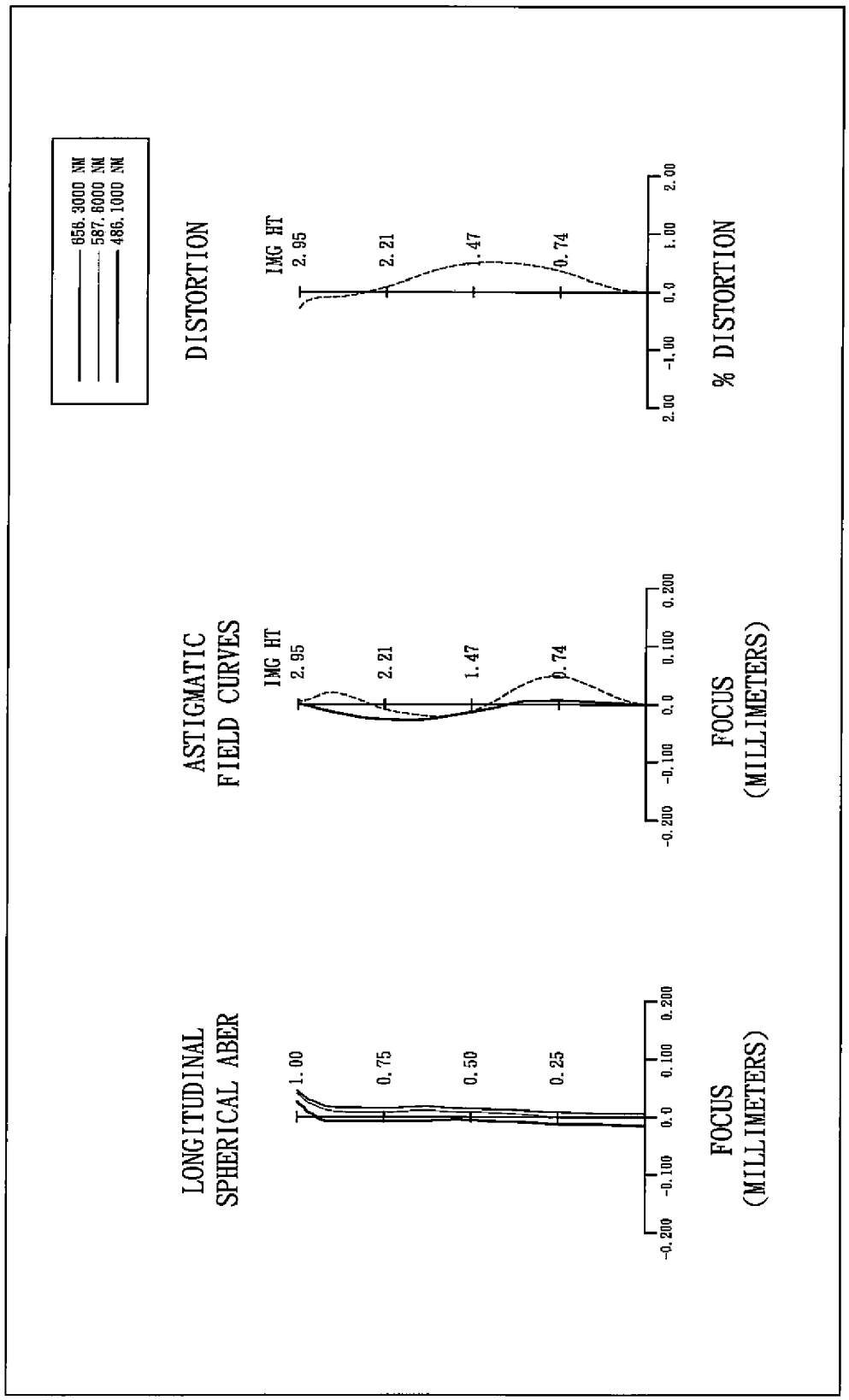
FIG. 4 shows the aberration curve of the second embodiment of the present invention.

Referring to FIG. 3, which shows an optical lens system for taking image in accordance with a second embodiment of the present invention, and FIG. 4 shows the aberration curve of the second embodiment of the present invention. The second embodiment of the present invention is an optical lens system for taking image comprising three lens elements with refractive power, and the optical lens system for taking image comprises: from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with positive refractive power has a convex object-side surface 31 and a concave image-side surface 32, the object-side surface 31 and the image-side surface 32 of the third lens element 30 are aspheric, and each of the two surfaces is formed with an inflection point.

An aperture stop 40 is located between the first lens element 10 and the second lens element 20.

An IR cut filter 50 is located behind the third lens element 30 and has no influence on the focal length of the optical lens system.

A sensor cover glass 60 is located behind the IR cut filter 50 and has no influence on the focal length of the optical lens system.

An image plane 70 is located behind the sensor cover glass 60.

The equation of the curve of the aspheric surfaces of the second embodiment is the same as that of the first embodiment.

In the second embodiment of the optical lens system for taking image, the Abbe number of the second lens element is V2, and it satisfies the relation: V2=23.4.

In the second embodiment of the optical lens system for taking image, the refractive index of the first lens element is N1, and the refractive index of the second lens element is N2, and they satisfy the relations: N1=1.543, N2=1.632.

In the second embodiment of the optical lens system for taking image, the radius of curvature of the object-side surface of the first lens element is R1, the radius of curvature of the image-side surface of the first lens element is R2, the radius of curvature of the object-side surface of the second lens element is R3, the radius of curvature of the image-side surface of the second lens element is R4, the radius of curvature of the object-side surface of the third lens element is R5, the radius of curvature of the image-side surface of the third lens element is R6, they satisfy the relations: |R1/R2|=0.06, R3/R4=0.55, R5/R6=0.41.

In the second embodiment of the optical lens system for taking image, the focal length of the first lens element is f1, the focal length of the second lens element is f2, the focal length of the third lens element is f3, the focal length of the optical lens system for taking image is f, and they satisfy the relations: f/f1=1.22, |f/f2|=1.14, f/f3=0.91.

In the second embodiment of the optical lens system for taking image, the center thickness of the second lens element is CT2, the distance between the second lens element and the third lens element is T23, and they satisfy the relations: CT2=0.395 mm, T23=0.380 mm.

In the second embodiment of the optical lens system for taking image, the radius of curvature of the object-side surface of the first lens element is R1, the radius of curvature of the object-side surface of the second lens element is R3, the focal length of the optical lens system for taking image is f, and they satisfy the relations: R1=2.08945 mm, |R3|=0.88007 mm, R1/f=0.47, |R3/f|=0.20.

In the second embodiment of the optical lens system for taking image, the length of the optical lens system is TL, the image height of the optical lens system is ImgH, and they satisfy the relation: TL/ImgH=1.97.

In the second embodiment of the optical lens system for taking image, the chief ray angle of the maximal field of view is CRA, half of the maximal field of view is HFOV, and they satisfy the relation:

$$(\tan(CRA))/(\tan(HFOV))=0.68.$$

The detailed optical data the structure of the second embodiment is shown in table 3, and the aspheric surface data is shown in table 4, wherein the units of the radius of curvature, the thickness and the focal length are expressed in mm, and HFOV is half of the maximal field of view.

TABLE 5

|  | Embodiment 1 | Embodiment 2 |
|---|---|---|
| f | 4.46 | 4.47 |
| Fno | 3.20 | 2.90 |
| HFOV | 33.4 | 33.4 |
| V2 | 30.2 | 23.4 |
| N1 | 1.543 | 1.543 |
| N2 | 1.583 | 1.632 |
| f/f1 | 1.27 | 1.22 |
| |f/f2| | 1.34 | 1.14 |
| f/f3 | 1.02 | 0.91 |
| |R1/R2| | 0.16 | 0.06 |
| R3/R4 | 0.47 | 0.55 |
| R5/R6 | 0.35 | 0.41 |
| R1 | 2.17692 | 2.08945 |
| |R3| | 0.86293 | 0.88007 |
| R1/f | 0.49 | 0.47 |
| |R3/f| | 0.19 | 0.20 |
| CT2 | 0.412 | 0.395 |
| T23 | 0.372 | 0.380 |
| tan(CRA)/tan(HFOV) | 0.62 | 0.68 |
| TL/ImgH | 1.98 | 1.97 |

It is to be noted that the tables 1-4 show different data of the different embodiments, however, the data of the different embodiments is obtained from experiments. Therefore, any product of the same structure is contemplated to be within the

TABLE 3

(Embodiment 2)
f(focal length) = 4.47 mm, Fno = 2.9, HFOV (half of field of view) = 33.4 deg.

| Surface # |  | Curvature Radius | Thickness | Material | Index | Abbe # | Focal length |
|---|---|---|---|---|---|---|---|
| 0 | Object | Plano | Infinity |  |  |  |  |
| 1 | Lens 1 | 2.08945(ASP) | 0.757 | Plastic | 1.543 | 60.3 | 3.65 |
| 2 |  | −34.53540(ASP) | 0.021 |  |  |  |  |
| 3 | Ape. Stop | Plano | 0.771 |  |  |  |  |
| 4 | Lens 2 | −0.88007(ASP) | 0.395 | Plastic | 1.632 | 23.4 | −3.89 |
| 5 |  | −1.60798(ASP) | 0.380 |  |  |  |  |
| 6 | Lens 3 | 1.75214(ASP) | 1.082 | Plastic | 1.53 | 55.8 | 4.88 |
| 7 |  | 4.27770(ASP) | 0.200 |  |  |  |  |
| 8 | IR-filter | Plano | 0.300 | Glass | 1.517 | 64.1 | — |
| 9 |  | Plano | 0.500 |  |  |  |  |
| 10 | Cover Glass | Plano | 0.500 | Glass | 1.517 | 64.1 | — |
| 11 |  | Plano | 0.914 |  |  |  |  |
| 12 | Image | Plano |  |  |  |  |  |

TABLE 4

Aspheric Coefficient

| Surface # | 1 | 2 | 4 | 5 | 6 | 7 |
|---|---|---|---|---|---|---|
| K = | −3.46872E+00 | 0.00000E+00 | −2.36639E+00 | −1.05307E−01 | −9.91997E+00 | −5.85911E−02 |
| A4 = | 2.91905E−02 | −6.94872E−02 | −2.59205E−01 | −9.30243E−02 | −2.55918E−02 | −4.85171E−02 |
| A6 = | −3.52623E−02 | −4.10585E−02 | 1.01750E−01 | 1.60113E−01 | 8.16120E−03 | 7.44587E−03 |
| A8 = | 9.23385E−03 | −1.24565E−02 | 4.91187E−01 | 7.22121E−02 | −8.48420E−04 | −1.36414E−03 |
| A10 = | −2.46233E−02 | 1.96607E−02 | −4.48435E−01 | −5.50844E−02 | — | 2.47186E−04 |
| A12 = | — | — | — | — | — | −2.18865E−05 | scope of the present invention even if it uses different data. Table 5 is the data relevant to the present invention of the respective embodiments.

While we have shown and described various embodiments in accordance with the present invention, it is clear to those skilled in the art that further embodiments may be made without departing from the scope of the present invention.

What is claimed is:

1. An optical lens system for taking image comprising three lens elements with refractive power, from the object side to the image side:
    a first lens element with positive refractive power having a convex object-side surface and a convex image-side surface, the object-side surface of the first lens element being aspheric;
    a plastic second lens element with negative refractive power having a concave object-side surface and a convex image-side surface, the object-side surface and the image-side surface of the second lens element being aspheric;
    a plastic third lens element with positive refractive power having a convex object-side surface and a concave image-side surface, the object-side surface and the image-side surface of the third lens element being aspheric; and
    an aperture stop located between the first lens element and the second lens element;
    the first lens element is made of plastic material, the image-side surface of the first lens element is aspheric, and the third lens element is formed with at least one inflection point;
    an Abbe number of the second lens element is V2, and it satisfies the relation: V2<40;
    a center thickness of the second lens element is CT2, and it satisfies the relation: 0.25 mm<CT2<0.4 mm.

2. The optical lens system for taking image as claimed in claim 1, wherein an Abbe number of the second lens element is V2, and it satisfies the relation: V2<28.

3. The optical lens system for taking image as claimed in claim 2, wherein an Abbe number of the second lens element is V2, and it satisfies the relation: V2<25.

4. The optical lens system for taking image as claimed in claim 1, wherein a refractive index of the first lens element is N1. and it satisfies the relation: N1<1.6.

5. The optical lens system for taking image as claimed in claim 1, wherein a refractive index of the second lens element is N2, and it satisfies the relation: N2<1.75.

6. The optical lens system for taking image as claimed in claim 5, wherein a refractive index of the second lens element is N2, and it satisfies the relation: N2<1.65.

7. The optical lens system for taking image as claimed in claim 1, wherein a radius of curvature of the object-side surface of the first lens element is R1, and a radius of curvature of the image-side surface of the first lens element is R2, they satisfy the relation: 0.01<|R1/R2|<0.35.

8. The optical lens system for taking image as claimed in claim 7, wherein a radius of curvature of the object-side surface of the first lens element is R1, and a radius of curvature of the image-side surface of the first lens element is R2, they satisfy the relation: 0.03<|R1/R2|<0.18.

9. The optical lens system for taking image as claimed in claim 7, wherein a focal length of the second lens element is f2, a focal length of the optical lens system is f, and they satisfy the relation: 0.7<|f/f2|<1.4.

10. The optical lens system for taking image as claimed in claim 7, wherein a focal length of the third lens element is f3, a focal length of the optical lens system is f, and they satisfy the relation: f/f3>0.7.

11. The optical lens system for taking image as claimed in claim 7, wherein a radius of curvature of the object-side surface of the first lens element is R1, a radius of curvature of the object-side surface of the second lens element is R3, and they satisfy the relation: R1<2.3 mm, |R3|<1.0 mm.

12. The optical lens system for taking image as claimed in claim 7, wherein a radius of curvature of the object-side surface of the first lens element is R1, a radius of curvature of the object-side surface of the second lens element is R3, the focal length of the optical lens system is f, and they satisfy the relation: R1/f<0.52, |R3/f|<0.23.

13. The optical lens system for taking image as claimed in claim 1, wherein a radius of curvature of the object-side surface of the second lens element is R3, and a radius of curvature of the image-side surface of the second lens element is R4, they satisfy the relation: 0.45<R3/R4<0.6.

14. The optical lens system for taking image as claimed in claim 13, wherein a radius of curvature of the object-side surface of the third lens element is R5, and a radius of curvature of the image-side surface of the third lens element is R6, they satisfy the relation: 0.3<R5/R6<0.45.

15. The optical lens system for taking image as claimed in claim 1, wherein a distance between the second lens element and the third lens element is T23, and it satisfies the relation: T23>0.25 mm.

16. The optical lens system for taking image as claimed in claim 1, wherein a focal length of the first lens element is f1, the focal length of the optical lens system is f, and they satisfy the relation: f/f1>0.95.

17. The optical lens system for taking image as claimed in claim 16, wherein the focal length of the first lens element is f1, a focal length of the optical lens system is f, and they satisfy the relation: f/f1>1.22.

18. The optical lens system for taking image as claimed in claim 17. wherein an Abbe number of the second lens element is V2, and it satisfies the relation: V2<40.

19. An optical lens system for taking image comprising three lens elements with refractive power, from the object side to the image side:
    a first lens element with positive refractive power having a convex object-side surface and a convex image-side surface, the object-side surface of the first lens element being aspheric;
    a plastic second lens element with negative refractive power having a concave object-side surface and a convex image-side surface, the object-side surface and the image-side surface of the second lens element being aspheric;
    a plastic third lens element with positive refractive power having a convex object-side surface and a concave image-side surface, the object-side surface and the image-side surface of the third lens element being aspheric; and
    an aperture stop located between the first lens element and the second lens element; wherein:
    the first lens element is made of plastic material, the image-side surface of the first lens element is aspheric, and the third lens element is formed with at least one inflection point;
    an Abbe number of the second lens element is V2, and it satisfies the relation: V2<40;
    an electronic sensor is disposed in the optical lens system, and an object to be photographed is imaged on an electronic sensor, a length of the optical lens system is TL, an image height of the optical lens system is ImgH, and they satisfy the relation: TL/ImgH<2.05.

* * * * *